July 22, 1952
C. H. TAYLOR
2,604,192
EMERGENCY BRAKE
Filed Sept. 1, 1950
2 SHEETS—SHEET 1
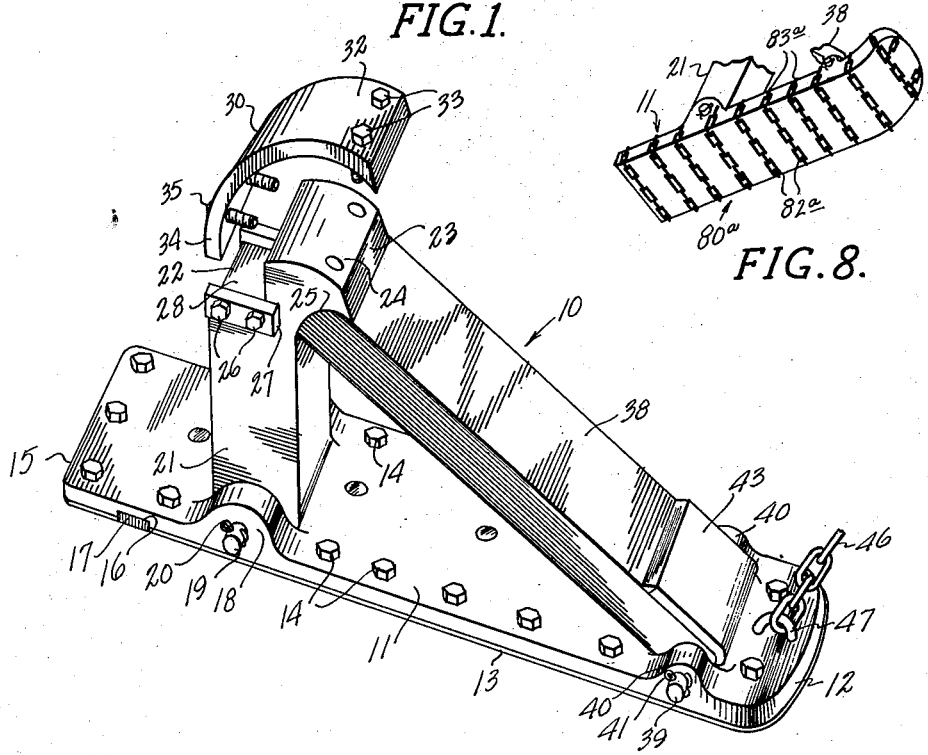
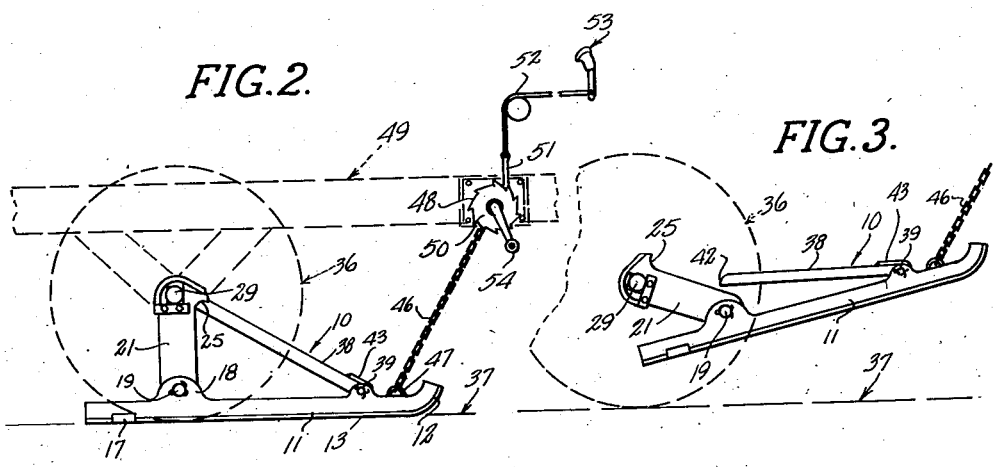
Inventor
CHARLES H. TAYLOR,
By McMorrow, Berman & Davidson
Attorneys July 22, 1952  C. H. TAYLOR  2,604,192
EMERGENCY BRAKE
Filed Sept. 1, 1950  2 SHEETS—SHEET 2
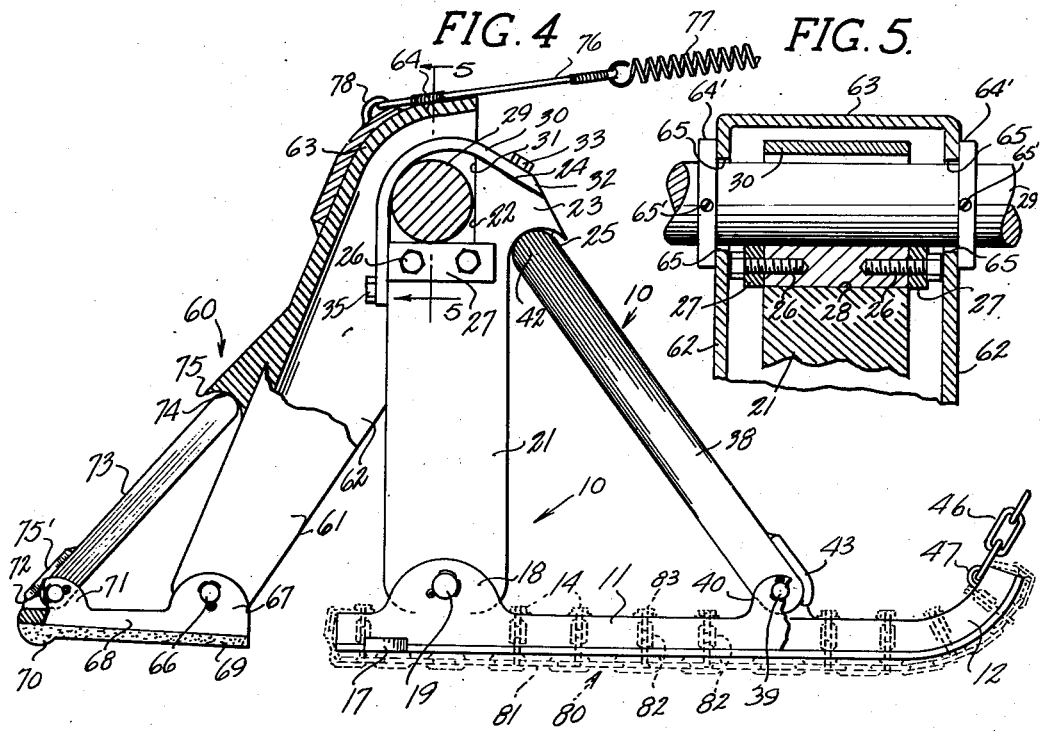
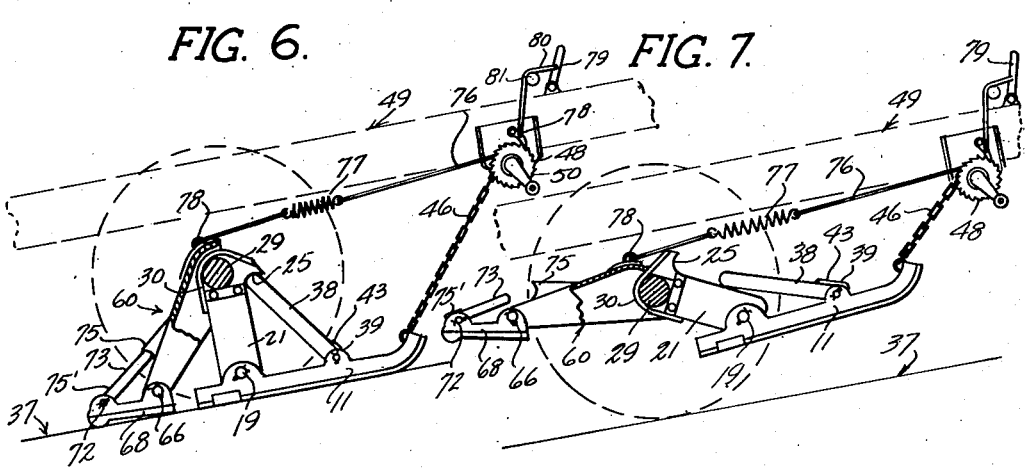
Inventor
CHARLES H. TAYLOR,
By McMorrow, Berman & Davidson
Attorneys Patented July 22, 1952

2,604,192

UNITED STATES PATENT OFFICE 2,604,192

EMERGENCY BRAKE

Charles H. Taylor, Huntington Park, Calif.

Application September 1, 1950, Serial No. 182,772

10 Claims. (Cl. 188—5)

This invention relates to an improved vehicle emergency brake of the ground-engaging type, the primary object of the invention being to provide a more efficient and practical brake of this character which is readily applicable to the rear axles of trucks, trailers, buses and passenger cars to provide the drivers thereof with instantly available and reliable means of stopping the vehicle in either forward or rearward travel, to act either as a supplement to the ordinary vehicle brakes or as the sole braking means in the event of failure of the ordinary brakes.

Another important object of the invention is to provide a brake of the above-indicated character which is of simple and mechanically adequate construction and can be made in rugged and serviceable form at relatively low cost.

Other important objects and advantageous features of the invention will be apparent from the following description and the accompanying drawings, wherein, merely for purposes of illustration herein, specific embodiments of the invention are set forth in detail.

In the drawings:

Figure 1 is a perspective view of one embodiment;

Figure 2 is a fragmentary side elevation on a reduced scale, showing the brake of Figure 1 installed on the rear axle of a vehicle and in braking position;

Figure 3 is a similar view showing the brake elevated to inoperative position;

Figure 4 is a side elevation, partly in section, showing the brake of Figures 1 to 3 combined with a roll-back brake and showing a non-skid chain attachment in dotted lines;

Figure 5 is a fragmentary transverse vertical section taken on the line 5—5 of Figure 4;

Figure 6 is a fragmentary side elevation, on a reduced scale, showing the combination of Figure 4 in operative braking position;

Figure 7 is a similar view, showing the combination in inoperative position; and Figure 8 is a fragmentary bottom perspective view, on a reduced scale, showing the anti-skid chain attachment.

Referring in detail to the drawings, wherein like numerals designate like parts throughout the several views, the numeral 10 generally designates the forward-motion-arresting brake, comprising a flat runner-like, ground-engaging shoe 11 upturned at its forward end at 12 and having a friction lining 13 along its bottom secured by rivets 14 or the like. Near the rear end 15 of the shoe 10 is a transverse slot 16 formed in the bottom of the shoe and through the lining 13, in which is secured a strip 17 of lead or other soft friction-increasing material.

Laterally-spaced ears 18, 18 rise from the top of the shoe 11 near its rear end 15 and have journaled therethrough a pivot pin 19 secured in place by cotter keys 20 and traversing the lower end of the vertically-elongated leg 21. The upper end of the leg 21 is cut away, at its rear corner, as indicated at 22, and its forward corner is enlarged to project forwardly, as at 23. The top 24 of the projection 23 declines forwardly and the under surface 25 thereof is forwardly and downwardly curved, to provide an abutment or stop.

Secured by bolts 26, 26 to opposite sides of the leg 21 are bearing plates 27 which project slightly above the surface 28 defined by the cut 22 to engage the under surface of a vehicle rear axle 29. A curved mounting plate 30 overlies the axle 29 and maintains the bearing plates 27 and the vertical surface 31 of the cut-away 22 in engagement with the axle. The forward end 32 of the mounting plate 30 has the same declination as the top 24 of the projection 23 and is secured thereto by means of bolts 33, while the rearward or lower end 34 of the mounting plate 30 is secured to the back of the leg 21 below the cut-away surface 28 by means of bolts 35. The connection with the axle 29 produced by these parts is such that the brake 10 can swing downwardly from the position shown in Figure 3 to the position shown in Figure 2, under its own weight, while providing a secure and non-rattling mounting of the brake 10 on the axle 29. Usually two of the brakes 10 will be used on the rear axles of motor vehicles, but in the case of a trailer, a single enlarged version of the brake 10 may be used at the middle of the rear axle thereof.

The height of the leg 21 in erect position and the thickness of the shoe 11 are so proportioned that when the leg 21 is in erect, operative position, the rear vehicle wheels 36 will be elevated off the ground 37, so that the weight of the vehicle is thrown onto the shoe 11 for greater and more effective frictional engagement with the ground 37.

A diagonal brace 38 is provided to hold the shoe 11 down in engagement with the ground 37 in the operative position of the brake 10, and is hinged at its forward end on a pivot pin 39 journaled through laterally spaced ears 40, 40 on the forward part of the top of the shoe 11 and secured in place by means of cotter pins 41. The rear or upper end 41 of the brace 38 is rounded to fit the concave under surface 25 of the projection 23 on the upper end of the leg 21, in the braking position of the brake 10, as shown in Figures 1, 2, 4 and 5. A lug 43 secured to the upper side of the brace 38 projects therebelow to engage the shoe 11, whereby the brace 38 is prevented from swinging too far forwardly when disengaged from the leg projection 23.

The brake 10 is held up in inoperative position and let down to operative position by a chain 46 secured to an eye 47 on the shoe 11 forwardly of the ears 40 and trained over a drum 48 mounted on the vehicle chassis 49 forwardly of the brake 10. The drum 48 can be equipped with a ratchet wheel 50 with which a ratchet pawl 51 is normally engaged, which can be withdrawn from the ratchet wheel whenever desired by a cable 52 connected to a handle 53 located within easy reach of the driver of the vehicle. A crank handle 54 is provided to rotate the drum 48 to wind the chain 46 on the drum and thereby elevate the brake 10 to inoperative position, from which the brake may be instantaneously dropped to braking position by operating the handle 53.

As shown in Figure 3, the brace 38 falls out of engagement with the leg 21, the leg 21 tilts rearwardly, and the shoe 11 is displaced forwardly in the elevated or inoperative position of the brake 10. As the brake 10 is dropped toward engagement with the ground 37, the parts approach the positions shown in Figure 2, and in so doing the shoe 11 is pushed rearwardly by contact with the ground 37 and the brace 38 is caused to climb the front side of the leg 21 and engage the under side of the projection 23, whereupon continuance of the rearward movement of the shoe 11 jams or binds the parts together and lifts the vehicle wheels off the ground 37 and puts the weight of the vehicle on the shoe 11, whereby forward motion of the vehicle is quickly arrested.

As shown in Figures 4 to 7, the forward-motion brake 10 can be supplemented by a rearward-motion brake 60 designed for use in holding a vehicle on an incline, as shown in Figure 6, against reverse or backward rolling thereof whenever the ordinary vehicle brakes are inadequate.

The brake 60 comprises a channel leg 61 open at its front to receive the upper part of the leg 21 of the brake 10, the leg 61 having side walls 62, 62 and at its upper end the web 63 between the side walls curves forwardly and upwardly, as indicated at 64, and is substantially concentrically spaced from the curved mounting plate of the brake 10. The side walls 62 have holes 65 through which vehicle axle 29 extends, and whereby leg 61 is swingably mounted to the rear of brake 10. Stop collars 64' equipped with locking set screws 65' are positioned on axle 29 at opposite sides of leg 61 to hold the same in proper position.

The lower end of leg 61 is traversed by a pivot pin 66 journaled in ears 67 rising from the forward end of a shoe 68 having on its under side a friction lining 69 terminating at its rear end in a transverse depending rounded heel 70. Rising on the rear end of shoe 68 are ears 71 through which a pivot pin 72 is journaled, and on this pin is hinged the lower end of brace arm 73. In the depressed operative position of brake 60 the rounded upper end 74 of the arm is arranged to engage under a concave projection 75 on the back of brace arm 73, as shown in Figure 4, whereby the rear end of the shoe 68 is held down in braking engagement with the ground 37. As the vehicle moves rearwardly, the parts are jammed together as shoe 68 is carried forwardly and the weight of the vehicle is imposed upon the heel 70. A lug 75' on the back of the arm 73 to engage the shoe 68 to prevent excessive rearward swinging of the arm 73.

A cable 76, having a contractile helical spring 77 therein, is stretched between an eye 78 on the rear of the upper end of the leg web portion 64 and the forwardly located operating lever 85.

As shown in Figures 4 and 8, the anti-skid properties of the forward-motion braking shoe 11 can be supplemented for snow or ice conditions by an anti-skid chain attachment 80 consisting of longitudinal, laterally spaced chains 81, connected by cross-chains 82, having end links 83 secured by the bolts 14 on the top of the shoe 11, as shown in Figure 4. Or, a chain attachment 80a, shown in Figure 8, may be used which involves only cross-chains 82a having their end links 83a secured by the bolts 14 on the top of the shoe 11.

With reference to Figures 6 and 7, the spring 77 permits operation of both forward and rearward-motion brakes from the drum 48 to which the cable 76 and chain 46 are attached, the drum having a ratchet and pawl mechanism 78 controlled by the pivoted lever 79 through a flexible element 80 entrained over a guide sheave 81. When the forward and rearward-motion brakes are in depressed operating position, the forward brake can be retracted to elevated inoperative position, and in so doing tension the spring 77. With the spring 77 so tensioned, a slight forward movement of the vehicle causes the rearward-motion brake to be released from engagement with the ground 37, whereupon the spring 77 contracts and retracts the rearward brake into elevated inoperative position.

I claim:

1. In a vehicle brake, a leg, mounting means on one end of said leg for mounting said leg on a vehicle to swing in opposite directions on an axis extending across the vehicle, a ground-engaging shoe adapted to extend forwardly and rearwardly with respect to the vehicle, said shoe being pivoted on the opposite end of said leg on an axis extending across the vehicle, a stop on said leg, a brace located on the same side of said leg as said stop and declining from said leg and having its depressed end pivoted to said shoe with its elevated and free end arranged to engage under said stop, and operating means connected to said shoe and operable in one direction for moving said shoe forwardly so as to swing said leg forwardly and upwardly on the axis of said mounting means and permit said brace to swing rearwardly and downwardly and disengage its free end from said stop, thereby elevating said shoe above a ground-engaging position.

2. In a vehicle brake, a leg, mounting means on one end of said leg for mounting said leg on a vehicle to swing in opposite directions on an axis extending across the vehicle, a ground-engaging shoe adapted to extend forwardly and rearwardly with respect to the vehicle, said shoe being pivoted on the opposite end of said leg on an axis extending across the vehicle, a stop on said leg, a brace located on the same side of said leg as said stop and declining from said leg and having its depressed end pivoted to said shoe with its elevated end free and arranged to engage under said stop, and operating means connected to said shoe and operable in one direction for moving said shoe forwardly so as to swing said leg forwardly and upwardly on the axis of said mounting means and permit said brace to swing rearwardly and downwardly and disengage its free end from said stop, thereby elevating said shoe above a ground-engaging position, said shoe having anti-skid chain means on its under side.

3. In a vehicle brake, a leg, mounting means on one end of said leg for mounting said leg on a vehicle to swing in opposite directions on an axis extending across the vehicle, a ground-engaging shoe adapted to extend forwardly and rearwardly with respect to the vehicle, said shoe being pivoted on the opposite end of said leg on an axis extending across the vehicle, a stop on said leg, a brace located on the same side of said leg as said stop and declining from said leg and having its depressed end pivoted to said shoe with its elevated end free and arranged to engage under said stop, and operating means connected to said shoe and operable in one direction for moving said shoe forwardly so as to swing said leg forwardly and upwardly on the axis of said mounting means and permit said brace to swing rearwardly and downwardly and disengage its free end from said stop, thereby elevating said shoe above a ground-engaging position, a second leg positioned at the side of the first-mentioned leg from said brace, second mounting means on said second leg associated with the first-mentioned mounting means, a second ground-engaging shoe pivoted on said second leg, a stop on said second leg, a second brace pivoted on said second shoe and engageable with the stop on said second leg in a ground-engaging position of said second shoe, said operating means having a component connected to said second leg for swinging said second leg in a direction to elevate said second shoe from ground-engaging position.

4. In a vehicle brake, a leg, mounting means on one end of said leg for mounting said leg on a vehicle to swing in opposite directions on an axis extending across the vehicle, a ground-engaging shoe adapted to extend forwardly and rearwardly with respect to the vehicle, said shoe being pivoted on the opposite end of said leg on an axis extending across the vehicle, a stop on said leg, a brace located on the same side of said stop and declining from said leg and having its depressed end pivoted to said shoe with its elevated end free and arranged to engage under said stop, and operating means connected to said shoe and operable in one direction for moving said shoe forwardly so as to swing said leg forwardly and upwardly on the axis of said mounting means and permit said brace to swing rearwardly and downwardly and disengage its free end from said stop, thereby elevating said shoe above a ground-engaging position, a second leg positioned at the side of the first-mentioned leg from said brace, second mounting means on said second leg associated with the first-mentioned mounting means, a second ground-engaging shoe pivoted on said second leg, a stop on said second leg, a second brace pivoted on said second shoe and engageable with the stop on said second leg in a ground-engaging position of said second shoe, said operating means having a component connected to said second leg for swinging said second leg in a direction to elevate said second shoe from ground-engaging position independently of said first leg, said operating means having a second component connected to said first shoe for elevating said first shoe independently of said second shoe.

5. In a vehicle brake, a leg, mounting means on one end of said leg for mounting said leg on a vehicle to swing in opposite direction on an axis extending across the vehicle, a ground-engaging shoe adapted to extend forwardly and rearwardly with respect to the vehicle, said shoe being pivoted on the opposite end of said leg on an axis extending across the vehicle, a stop on said leg, a brace located on the same side of said leg as said stop and declining from said leg and having its depressed end pivoted to said shoe with its elevated end free and arranged to engage under said stop, and operating means connected to said shoe and operable in one direction for moving said shoe forwardly so as to swing said leg forwardly and upwardly on the axis of said mounting means and permit said brace to swing rearwardly and downwardly and disengage its free end from said stop, thereby elevating said shoe above a ground-engaging position, a second leg positioned at the side of the first-mentioned leg from said brace, second mounting means on said second leg associated with the first-mentioned mounting means, a second ground-engaging shoe pivoted on said second leg, a stop on said second leg, a second brace pivoted on said second shoe and engageable with the stop on said second shoe, said operating means having a component connected to said second leg for swinging said second leg in a direction to elevate said second shoe from ground-engaging position independently of said first leg, said operating means having a second component connected to said first shoe for elevating said first shoe independently of said second shoe, the first-mentioned component of said operating means comprising spring means arranged to be tensioned by actuation of the second component for conditioning elevation of said second shoe out of ground-engaging position by said spring means upon movement of the vehicle in one direction while said second shoe is in ground-engaging position.

6. An emergency brake for a vehicle having a frame, a rear axle on the frame, and ground-engaging wheels on the axle, comprising a leg, mounting means for pivoting said leg on the axle to swing downwardly and rearwardly to operative position from an elevated inoperative position, a ground-engaging shoe pivoted on the lower end of said leg to frictionally engage the ground when said leg is in depressed operative position, a rearwardly inclined diagonal brace having a depressed forward end pivoted to said shoe forwardly of said leg and having a free rearward end arranged to ride along the front of said leg in elevated and depressed positions of said leg, a forward projection on the upper part of said leg under which said free end of said brace is arranged to engage as said leg is swung downwardly into operative position and said shoe engages the ground whereby upward tilting of said shoe relative to said leg is precluded as the shoe and said leg are moved rearwardly relative to the axle by contact of said shoe with the ground during forward motion of the vehicle, the combined vertical dimensions of said shoe and leg being greater than the diameter of the vehicle wheels whereby at a point in the rearward movement of said shoe and leg relative to the axle the wheels will be lifted off the ground and the weight of the vehicle imposed upon said shoe, and operating means on the vehicle frame for swinging said leg and shoe upwardly and forwardly to inoperative position and for releasing said leg and shoe to subside to operative position.

7. An emergency brake for a vehicle having a frame, a rear axle on the frame, and ground-engaging wheels on the axle, comprising a leg, mounting means for pivoting said leg on the axle to swing downwardly and rearwardly to operative position from an elevated inoperative position, a ground-engaging shoe pivoted on the lower end of said leg to frictionally engage the ground, when said leg is in depressed operative position, a rearwardly inclined diagonal brace having its depressed forward end pivoted to said shoe at a point forwardly of said leg and having its free rearward end arranged to ride along the front of said leg in elevated and depressed positions of said leg, a forward projection on the upper part of said leg under which said free end of said brace is arranged to engage as said leg is swung downwardly into operative position and said shoe engages the ground whereby upward tilting of said shoe relative to said leg is precluded as the shoe and said leg are moved rearwardly relative to the axle by contact of said shoe with the ground during forward motion of the vehicle, the combined vertical dimensions of said shoe and leg being greater than the diameter of the vehicle wheels whereby at a point in the rearward movement of said shoe and leg relative to the axle the wheels will be lifted off the ground and the weight of the vehicle imposed upon said shoe, and operating means on the vehicle frame for swinging said leg and shoe upwardly and forwardly to inoperative position and for releasing said leg and shoe to subside to operative position, said mounting means comprising a portion on the upper end of said leg presenting angularly related abutment surfaces to the front and under sides of the axle, and a mounting plate to extend over the axle between said surfaces and secured to the upper end of said leg whereby said leg is supportably journaled on the axle.

8. An emergency brake for a vehicle having a frame, a rear axle on the frame, and ground-engaging wheels on the axle, comprising a leg, mounting means for pivoting said leg on the axle to swing downwardly and rearwardly to operative position from an elevated inoperative position, a ground-engaging shoe pivoted on the lower end of said leg to frictionally engage the ground when said leg is in depressed operative position, a rearwardly inclined diagonal brace having its depressed forward end pivoted to said shoe at a point forwardly of said leg and having a free rearward end arranged to ride along the front of said leg in elevated and depressed positions of said leg, a forward projection on the upper part of said leg under which said free end of said brace is arranged to engage as said leg is swung downwardly into operative position and said shoe engages the ground whereby upward tilting of said shoe relative to said leg is precluded as the shoe and said leg are moved rearwardly relative to the axle by contact of said shoe with the ground during forward motion of the vehicle, the combined vertical dimensions of said shoe and leg being greater than the diameter of the vehicle wheels whereby at a point in the rearward movement of said shoe and leg relative to the axle the wheels will be lifted off the ground and the weight of the vehicle imposed upon said shoe, and operating means on the vehicle frame for swinging said leg and shoe upwardly and forwardly to inoperative position and for releasing said leg and shoe to subside to operative position, said operating means comprising a chain secured to the forward part of said shoe, a drum on the vehicle frame over which said chain is trained, and means for operating said drum in opposite directions.

9. An emergency brake for a vehicle having a frame, a rear axle on the frame, and ground-engaging wheels on the axle, comprising a leg, mounting means for pivoting said leg on the axle to swing downwardly and rearwardly to operative position from an elevated inoperative position, a ground-engaging shoe pivoted on the lower end of said leg to frictionally engage the ground when said leg is in depressed operative position, a downwardly inclined diagonal brace having its depressed forward end pivoted to said shoe at a point forwardly of said leg and having a free rearward end arranged to ride along the front of said leg in elevated and depressed positions of said leg, a forward projection on the upper part of said leg under which said free end of said brace is arranged to engage as said leg is swung downwardly into operative position and said shoe engages the ground whereby upward tilting of said shoe relative to said leg is precluded as the shoe and said leg are moved rearwardly relative to the axle by contact of said shoe with the ground during forward motion of the vehicle, the combined vertical dimensions of said shoe and leg being greater than the diameter of the vehicle wheels whereby at a point in the rearward movement of said shoe and leg relative to the axle the wheels will be lifted off the ground and the weight of the vehicle imposed upon said shoe, and operating means on the vehicle frame for swinging said leg and shoe upwardly and forwardly to inoperative position and for releasing said leg and shoe to subside to operative position, said brake further comprising a second leg positioned behind the first-mentioned leg, second mounting means for pivoting said other leg on the axle to swing on an axis substantially coincident with the pivoted axis of the first leg downwardly and forwardly to operative position from an elevated inoperative position, a second ground-engaging shoe pivoted on the lower end of the second leg to frictionally engage the ground to arrest rearward movement of the vehicle when said second leg is in depressed operative position, a second brace pivoted to said second shoe behind said second leg and having a free upper end, a rearward projection on said second leg with which the free end of said second brace is engageable in the operative positions of said second leg and second shoe whereby upward and forward tilting of said second shoe relative to said second leg while said second shoe is engaged with the ground is precluded.

10. An emergency brake for a vehicle having a frame, a rear axle on said frame, and ground-engaging wheels on the axle, comprising a leg, mounting means for pivoting said leg on the axle to swing downwardly and rearwardly to operative position from an elevated inoperative position, a ground-engaging shoe pivoted on the lower end of said leg to frictionally engage the ground when said leg is in depressed operative position, a rearwardly inclined diagonal brace having its depressed forward end pivoted to said shoe at a point forwardly of said leg and having a free rearward end arranged to ride along the front of said leg in elevated and depressed positions of said leg, a forward projection on the upper part of said leg under which said free end of said brace is arranged to engage as said leg is swung downwardly into operative position and said shoe engages the ground whereby upward tilting of said shoe relative to said leg is precluded as the shoe and said leg are moved rearwardly relative to the axle by contact of said shoe with the ground during forward motion of the vehicle, the combined vertical dimensions of said shoe and leg being greater than the diameter of the vehicle wheels whereby at a point in the rearward movement of said shoe and leg relative to the axle the wheels will be lifted off the ground and the weight of the vehicle imposed upon said shoe, and operating means on the vehicle frame for swinging said leg and shoe upwardly and forwardly to inoperative position and for releasing said leg and shoe to subside to operative position, said brake further comprising a second leg positioned behind the first-mentioned leg, second mounting means for pivoting said other leg on the axle to swing on an axis substantially coincident with the pivotal axis of the first leg downwardly and forwardly to operative position from an elevated inoperative position, a second ground-engaging shoe pivoted on the lower end of the second leg to frictionally engage the ground to arrest rearward movement of the vehicle when said second leg is in depressed operative position, a second brace pivoted to said second shoe behind said second leg and having a free upper end, a rearward projection on said second leg with which the free end of said second brace is engageable in the operative positions of said second leg and second shoe whereby upward and forward tilting of said second shoe relative to said second leg while said second shoe is engaged with the ground is precluded, and connection means operating between said first and second legs whereby said second leg is raised and lowered by the raising and lowering of said first leg.

CHARLES H. TAYLOR.

REFERENCES CITED

The following references are of record in the file of this patent:

FOREIGN PATENTS

| Number | Country | Date |
|--------|---------|------|
| 186,994 | Switzerland | Oct. 15, 1936 |